Sept. 2, 1941.　　　　　P. SIMSICH　　　　　2,254,628
PRECOMBUSTION L-HEAD FOR DIESEL ENGINES
Filed Oct. 25, 1939

INVENTOR
Peter Simsich
BY
ATTORNEY

Patented Sept. 2, 1941

2,254,628

UNITED STATES PATENT OFFICE 2,254,628

PRECOMBUSTION L-HEAD FOR DIESEL ENGINES

Peter Simsich, Brooklyn, N. Y.

Application October 25, 1939, Serial No. 301,166

5 Claims. (Cl. 123—33)

This invention relates to new and useful improvements in a super-heater for Diesel engines.

The invention has for an object the construction of a super-heater adapted to be mounted within the combustion space of a Diesel engine to assist in the ignition of the fuel.

More specifically, the invention proposes a heat confining container mounted in the combustion space and having an inlet opening in line with the fuel nozzle for the combustion space, and arranged to receive some of the discharged fuel, and also having a plurality of outlet discharge slots directed towards the cylinder.

Still further the invention contemplates the provision of an incandescent plug mounted in the container and adapted to be electrically operated to assist the first ignitions of the fuel for the starting of the engine.

Still further the invention contemplates the super-heating of the heat confining container during the operation of the engine so that the atmosphere within the container is super-heated and acts quickly to burn the incoming fuel.

Another object of this invention resides in the provision of a means for regulating the outlet slots of the heat confining container so that there is some control of the degree of super-heating of the device.

For further comprehension of the invention, and of the objects and advantages thereof, reference will be had to the following description and accompanying drawing, and to the appended claims in which the various novel features of the invention are more particularly set forth.

In the accompanying drawing forming a material part of this disclosure:

Figure 1:
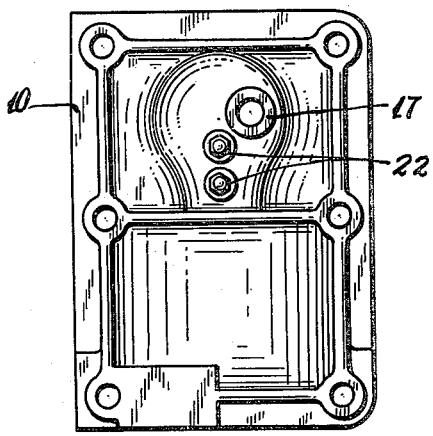
Fig. 1 is an elevational view of the outer side of a cylinder head equipped with a super-heater in accordance with this invention.
Figure 2:
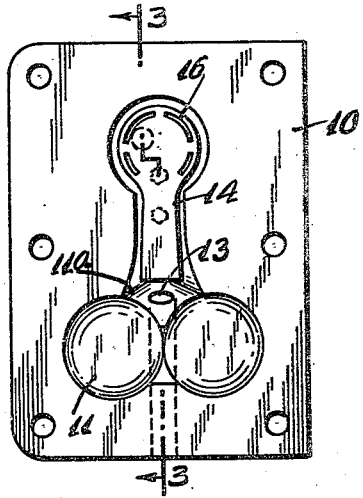
Fig. 2 is an elevational view of the inside of the cylinder head shown in Fig. 1.

The super-heater for Diesel engines, according to this invention, includes a cylinder head 10 having a combustion space 11 for connection with the cylinder upon which the head engages. A pump supply fuel nozzle 12 is disposed within a passage 13 in the cylinder head and is arranged to supply fuel to the combustion space 11, particularly at the area 11$^a$. A heat confining container 14 is mounted within the combustion space 11$^a$ and has a bottom inlet opening 15 in line with the fuel nozzle 12 for receiving some of the fuel discharged. This heat confining container 14 is also provided with a plurality of outlet discharge slots 16 directed towards the cylinder. An incandescent plug 17 is mounted in a passage 18 of the cylinder head 10 and extends through an opening 19 in the rear wall of the heat confining container 14, into the compass of the container 14.

The wall of the combustion space 11$^a$ is curved, and the rear wall 14$^a$ of the heat confining container is similarly curved to fit into the curvature of the wall of the combustion space. Several fastening elements 20 are mounted upon the rear wall of the container 14 and extend through openings 21 formed in the cylinder head to the outside thereof. These fastening elements are bolts, and nuts 22 are mounted on the outer ends of these bolts for fixedly clamping the heat confining container 14 in position.

Figure 3:
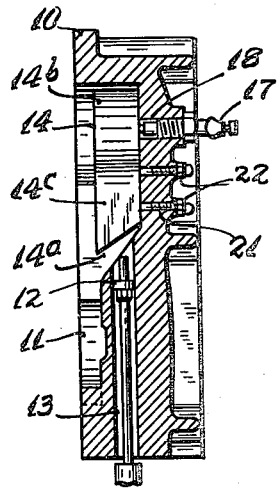
Fig. 3 is an enlarged vertical sectional view taken on the line 3—3 of Fig. 2.
Figure 4:
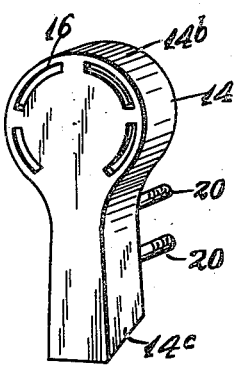
Fig. 4 is a perspective view of the super-heater illustrated per se.
Figure 5:
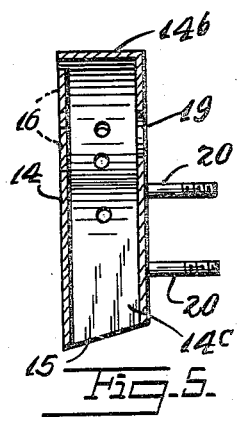
Fig. 5 is a vertical sectional view of the super-heater shown in Fig. 4.

The heat confining container 14 has a top head portion 14$^b$ which is of cylindrical form and connects with an elongated though somewhat narrower bottom section 14$^c$. The bottom wall of the section 14$^c$ is disposed at an inclination (see Figs. 3 and 5), and the inlet opening 15 is arranged through this inclined wall. The outlet discharge slots 16 are formed upon a circular area of the front wall of the heat confining container 14.

Figure 6:
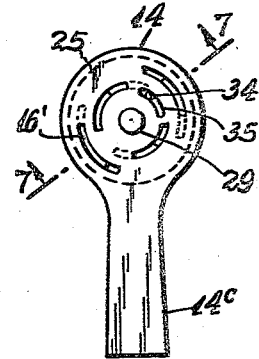
Fig. 6 is a front elevational view of a super-heater constructed in accordance with a modification of this invention.
Figure 7:
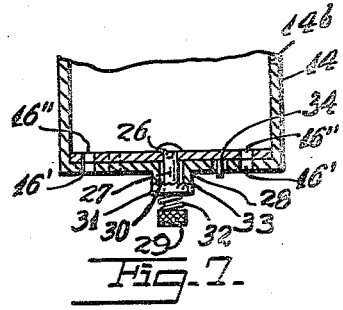
Fig. 7 is a fragmentary sectional view taken on the line 7—7 of Fig. 6.

In Figs. 6 and 7 a modified form of the invention has been disclosed which distinguishes from the prior form in the provision of a means for regulating the outlet discharge slots of the heat confining container. More specifically, the container 14 is provided with a plurality of outlet discharge slots 16' arranged in the front wall thereof. Immediately behind this front wall there is a rotatively mounted disc 25. This disc 25 is formed with complementary air discharge slots 16'' adapted in a certain position of the disc to register with the slots 16', and in the other positions of the disc to partially register with these slots. In this way there is a control of the discharge through the slots.

The disc 25 is fixedly mounted by a key 26 to a stem 27. This stem is axially of the disc 25 and rotatively extends through a hub portion 28 mounted upon the front wall of the container 14. The outer end of the stem 27 is provided with a knurled head 29 by which it may be manually turned. An outer portion of the stem 27 is provided with a key 30. This key engages a bushing 31 in a manner so that the bushing is longitudinally slidable on the stem, but non-rotative. The spring 32 is coaxially mounted on the outer portion of the stem 27 and acts between the head 29 and the bushing 31 for urging the bushing against the hub 28.

The contacting faces of the bushing 31 and the hub 28 are formed with serrated or roughened areas 33 so as to frictionally engage each other. A pin 34 projects from the disc 25 and extends into an arcuate slot 35 in the front wall of the container 14 to limit the distance through which the disc 25 may be turned.

The bushing 31 may be manually pulled outwards so as to disconnect the engaging serrations 33. Then the head 29 may be turned to turn the stem 27 which indirectly turns the disc 25. In this way it is possible to adjust the position of the disc for controlling the passages 16' and 16". When the bushing 31 is released, the spring 32 will re-engage the bushing with the hub 28 and so the disc 25 will be held in its newly adjusted position.

The operation of this form of the device is as follows:

The incandescent plug 17 is electrically heated for providing sufficient heat to initially start the engine. However, after the engine gets going the incandescent plug 17 no longer need be heated. The fuel discharging from the nozzle 12 will enter the container 14 where it becomes ignited and burns. The burning fuel discharges through the outlet slots of the container. Because of the confining action of the container the atmosphere within the container will retain its heat and will not readily be influenced by the cooling system of the engine. Consequently, the interior of the container will be maintained at a satisfactory temperature to efficiently cause the igniting of the fuel as required. In this manner the super-heating action is obtained.

The degree of super-heating, in the modified form of the invention illustrated in Figs. 6 and 7, may be controlled by adjusting the position of the disc 25 so as to control the amount of registration of the outlet slots 16' and 16".

It is to be understood that this device may be used either in air or water cooled engines, and that the size and proportion of the device may be changed as desired.

While I have illustrated and described the preferred embodiments of my invention, it is to be understood that I do not limit myself to the precise construction herein disclosed and the right is reserved to all changes and modifications coming within the scope of the invention as defined in the appended claims.

Having thus described my invention, what I claim as new and desire to secure by United States Letters Patent is:

1. A super-heater for Diesel engines, comprising a cylinder head having a combustion space for connection with a cylinder, a pump supplied fuel nozzle discharging into said combustion space, a heat confining container mounted in said combustion space and having an inlet opening in line with said fuel nozzle for receiving some of the discharged fuel, and a plurality of outlet discharge slots directed towards said cylinder, an incandescent plug mounted in said container, and means for regulating said outlet discharge slots, comprising a disc adjustably mounted on the wall of the container and having slots alignable with said outlet slots, and said disc being adjustable to move said aligning slots out of alignment with each other to various degrees.

2. A super-heater for Diesel engines, comprising a cylinder head having a combustion space for connection with a cylinder, a pump supplied fuel nozzle discharging into said combustion space, a heat confining container mounted in said combustion space and having an inlet opening in line with said fuel nozzle for receiving some of the discharged fuel, and a plurality of outlet discharge slots directed towards said cylinder, an incandescent plug mounted in said container, and means for regulating said outlet discharge slots, comprising a disc adjustably mounted on the wall of the container and having slots alignable with said outlet slots, and said disc being adjustable to move said aligning slots out of alignment with each other to various degrees, said plate being fixedly mounted on a stem rotatively extending through a hub in the wall of the container, and means upon said stem for holding said stem in various turned positions.

3. In combination with a cylinder head having a combustion space for connection with the cylinder of a Diesel engine, a pump supplied fuel nozzle discharging into said combustion space, a heat confining container mounted in said combustion space and having an inlet opening in line with said fuel nozzle for receiving some of the discharged fuel, an incandescent plug mounted in said container for igniting the fuel entering said container, and a plurality of discharge slots directed towards said cylinder and through which the ignited fuel is adapted to discharge to enter said cylinder, and a disc positioned adjacent the inside face of the wall of said container having said discharge slots, said disc being formed with slots in aligned positions with said discharge slots, a hub formed on said container concentric with said discharge slots, a stem having said disc securely mounted on the inner end thereof and its intermediate portion freely extended through said hub, and a head mounted on the outer end of said stem by which said stem may be rotated to similarly rotate said disc to align and disalign said slots to control the operative size of the discharge slots.

4. In combination with a cylinder head having a combustion space for connection with the cylinder of a Diesel engine, a pump supplied fuel nozzle discharging into said combustion space, a heat confining container mounted in said combustion space and having an inlet opening in line with said fuel nozzle for receiving some of the discharged fuel, an incandescent plug mounted in said container for igniting the fuel entering said container, and a plurality of discharge slots directed towards said cylinder and through which the ignited fuel is adapted to discharge to enter said cylinder, and a disc positioned adjacent the inside face of the wall of said container having said discharge slots, said disc being formed with slots in aligned positions with said discharge slots, a hub formed on said container concentric with said discharge slots, a stem having said disc securely mounted on the inner end thereof and its intermediate portion freely extended through said hub, and a head mounted on the outer end of said stem by which said stem may be rotated to similarly rotate said disc to align and disalign said slots to control the operative size of the discharge slots, and means for holding said stem in various fixed rotative positions.

5. In combination with a cylinder head having a combustion space for connection with the cylinder of a Diesel engine, a pump supplied fuel nozzle discharging into said combustion space, a head confining container mounted in said combustion space and having an inlet opening in line with said fuel nozzle for receiving some of the discharged fuel, an incandescent plug mounted in said container for igniting the fuel entering said container, and a plurality of discharge slots directed towards said cylinder and through which the ignited fuel is adapted to discharge to enter said cylinder, and a disc positioned adjacent the inside face of the wall of said container having said discharge slots, said disc being formed with slots in aligned positions with said discharge slots, a hub formed on said container concentric with said discharge slots, a stem having said disc securely mounted on the inner end thereof and its intermediate portion freely extended through said hub, and a head mounted on the outer end of said stem by which said stem may be rotated to similarly rotate said disc to align and disalign said slots to control the operative size of the discharge slots, and means for holding said stem in various fixed rotative positions, comprising a bushing keyed to the extended end of said stem to move only longitudinally thereof, a spring coaxially mounted on said stem and operating between the adjacent faces of said bushing and said head to urge said bushing into face contact with said hub, and serrations formed on the contacting faces of said hub and bushing for holding said stem against being rotated unless said bushing is manually moved outwards on said stem against the holding action of said spring.

PETER SIMSICH.